United States Patent [19]

Barish

[11] Patent Number: 4,844,384

[45] Date of Patent: Jul. 4, 1989

[54] ROTATING PARACHUTE

[76] Inventor: David T. Barish, 420 E. 51st St., New York, N.Y. 10022

[21] Appl. No.: 51,109

[22] Filed: May 15, 1987

[51] Int. Cl.[4] .............................................. B64D 17/00
[52] U.S. Cl. .................................. 244/142; 244/145; 244/152
[58] Field of Search ................ 244/142, 145, 152, 197

[56] References Cited

U.S. PATENT DOCUMENTS

| 2,770,432 | 11/1956 | Stevinson | 244/145 |
| 2,797,885 | 7/1957 | Barish | 244/145 |
| 2,949,266 | 8/1960 | Sepp, Jr. | 244/145 |
| 3,073,555 | 1/1963 | Barish | 244/145 |
| 3,118,641 | 1/1964 | Barish | 244/142 |
| 3,146,976 | 9/1964 | Houdou | 244/152 |
| 3,298,635 | 1/1967 | Barish | 244/145 |
| 3,420,479 | 1/1969 | Odney | 244/152 |
| 4,635,884 | 1/1987 | Nöhren | 244/142 |

FOREIGN PATENT DOCUMENTS 1156360  5/1958  France .................. 244/142

OTHER PUBLICATIONS

"Rotating Chute Reduces Glide and Drops to Ground Vertically", *Popular Mechanics*, Mar. 1959, vol. III, No. 3, p. 109.

Primary Examiner—Joseph F. Peters, Jr.
Assistant Examiner—L. M. Fiorito
Attorney, Agent, or Firm—Paul J. Sutton

[57]  ABSTRACT

An autorotating parachute is formed of spaced apart flexible flat panels with the peripheral edge of the panels being formed as a succession of arcuate edges and wherein the central portion of the canopy is substantially free of panel material.

23 Claims, 3 Drawing Sheets

FIG. 4
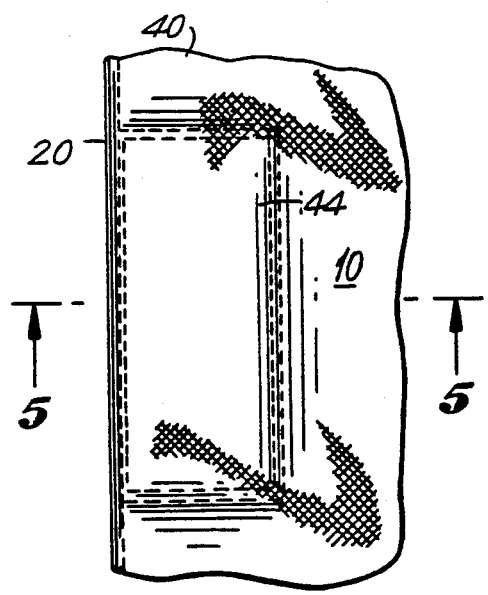
FIG. 5
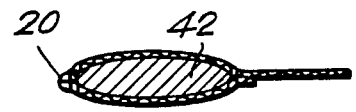
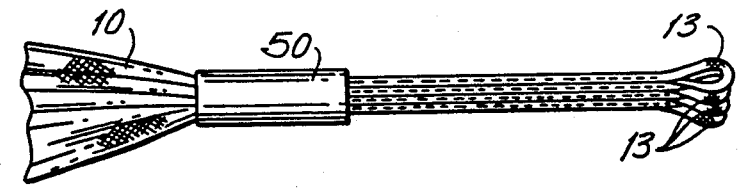
FIG. 6

ROTATING PARACHUTE

This invention relates to parachutes, and particularly to parachutes formed of peripherally spaced flexible panels capable of autorotation.

In U.S. Pat. No. 2,797,885, issued July 2, 1957, to David Theodore Barish, entitled "Vortex Ring Parachute", there is disclosed a flexible panel type of parachute in which the panels are substantially segmental, connected at their apices and at their peripheral margins, with the width of each panel varying directly with the radius, while the chord incidence varies inversely with the radius. While this has highly satisfactory performance, it has certain features affecting its favorable characteristics. For instance the panels of the invention of said patent were formed from initially generally flat substantial segments without axial overlap except at their apices. The ultimate camber of the panels after deployment is an adjustment between the tensions of the attachment points and the initially flat panels as affected by aerodynamic forces. The use of the twisted chord plane causes essentially zero incidence with respect to the relative wind. As a result, an appreciable amount of the lift is derived by camber, after autorotation becomes established.

In a subsequent patent, the same inventor attempted to further improve the effectiveness of the parachute by forming the canopy from individual panels which were preshaped and contoured to provide both chordwise and longitudinal camber built into the panels, using sewn-in darts or seams. Although the resulting parachutes were effective, they were relatively expensive to manufacture and were not completely stable when supporting a load having an aerodynamically large cross-section.

It is among the objects of this invention: to further improve autorotating parachutes; to provide a parachute using the autorotational principle to improve the drag characteristics, while also securing dependability, low cost, low snatch forces, low opening shock, anti-squidding and high stability for a given weight and/or volume of package, and without introducing any additionally disadvantageous problems; to provide a parachute formed of flexible flat panels of relatively low porosity material and which are not pre-shaped and contoured but which are widely spaced apart and connected only by suspension, pitch, or interpanel lines, or cords, which are extensions of binding cords secured around substantially the entire periphery of each panel and which extend out from several apices, or cusps, on the panel; to provide a parachute canopy of spaced, flat panels arranged uniformly about a central axis, each panel connected to two adjacent panels by straight lines extending between the respective leading and trailing edges of each, the leading edge of each panel being provided with at least one additional connecting line than the trailing edge of the same panel, to impart a desired aerodynamic camber distribution; to provide a parachute of spaced flexible panels connected by straight lines, where the panels are flat but wherein the periphery of each panel is secured to a continuous peripheral line along its full length, the lines extending outwardly beyond the panels to act as pitch control or connecting lines, the peripheral edge of the panel being formed as a succession of arcuate edges separated by and defining a series of cusps from which the lines extend, and wherein the central portion of the canopy is substantially free of panel material; to provide a parachute which can perform as a glide rotor by providing ballast along the outboard periphery of two or more panels; and to provide a centrifugal force effect by tilting the assembly, as when the load center of gravity is off-set from the center line of the parachute; to provide a parachute wherein the edge curvature of the leading edge is increased, to most effectively locate the camber, by placing more tension points on the leading edge; and many other objects and advantages of the invention will become more apparent as the description proceeds.

In the accompanying drawings forming part of this description:

FIG. 4 represents a fragmentary plan of the panel showing the ballast sewn into a pocket in the panel at the outboard edge, or skirt, portion.

FIG. 5 represents a section taken along lines 5—5 of FIG. 4.

FIG. 6 represents a fragmentary elevation of the parachute of this invention in a collapsed condition, showing the interpanel lines from adjacent panels held together within a slip tube.

Figure 1:
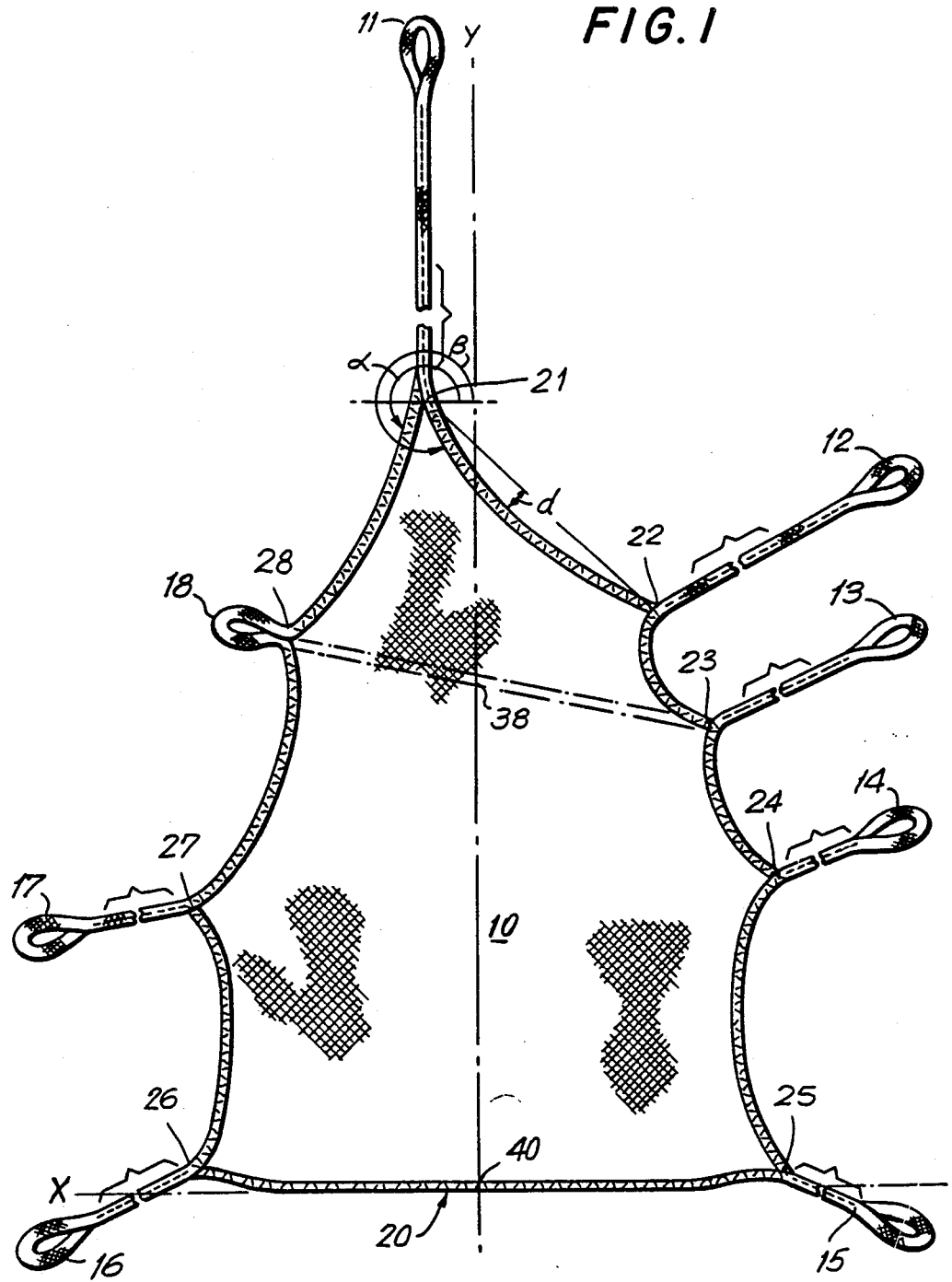
FIG. 1 represents a plan view of an illustrative flat panel according to the invention and the peripherally secured pitch and interpanel lines.

According to the present invention, a rotating parachute is formed from a combination of individual flat panels and connecting strings and suspension strings, connecting the canopy to a load. The individual panels are formed of a flexible fabric material, preferably one which has low porosity, as is explained in earlier U.S. Pat. No. 3,073,555, by the same inventor. As is explained in that earlier patent, in the present invention, the panels also function like rotor blades in autorotation (which cannot tolerate any substantial degree of porosity). As before, the porosity is preferably not greater than would permit a flow of two (2) cubic feet per minute/square foot at a pressure differential of two (2) inches of water.

The present invention provides a parachute which can be easily and inexpensively fabricated from flat panels wherein the periphery of the panel is secured along substantially its entire length to a relatively thin, strong but flexible cord, which also preferably extends continuously outwardly from the panel, at several predetermined points, as pitch lines or interpanel lines. The shape and size of the panel and the manner of interconnection as well as the number, of the suspension lines provides the desired effectiveness of an autorotary parachute at relatively low cost and with substantial ease of fabrication.

Referring to the drawings, a flat fabric panel, formed for example of ripstop nylon, is cut by a machine, in the indicated pattern. The useful pattern for the panel provides for a continuing series of arcuate portions, in which adjoining arcuate portions meet at acute angled cusps, except for the substantially straight outboard, or skirt, portion of each panel.

As shown, the panel fabric 10 is preferably cut so as to provide eight (8) cusps 21–28. The cusps are so arranged that the inboard cusp 21 and the two outboard cusps 25 and 26 define a triangle. The skirt portion 40 of each panel lies between the two outboard cusps 25, 26.

The entire periphery of the panel 10 is bound along its entire length, as by stitching, to a flexible but strong cord 20, which may be of the same material, or if desired, a different less elastic, material. This same cord extends continuously outwardly to form the pitch and interpanel lines 11, 12, 13, 14, 15, 16, 17, 18; at the end of each line is a loop wherein the cord doubles back on itself and continues around the periphery of the panel 10. There is thus a continuous edge tension member formed by the thin cord 20. To further strengthen the panel and to provide a desirable chordwise tension, a further portion of cord may be stitched to the panel, the cross-panel line 38, connecting the leading and trailing edges of the panel between cusps 23 and 28 and the respective interpanel lines 13, 18.

Figure 2:
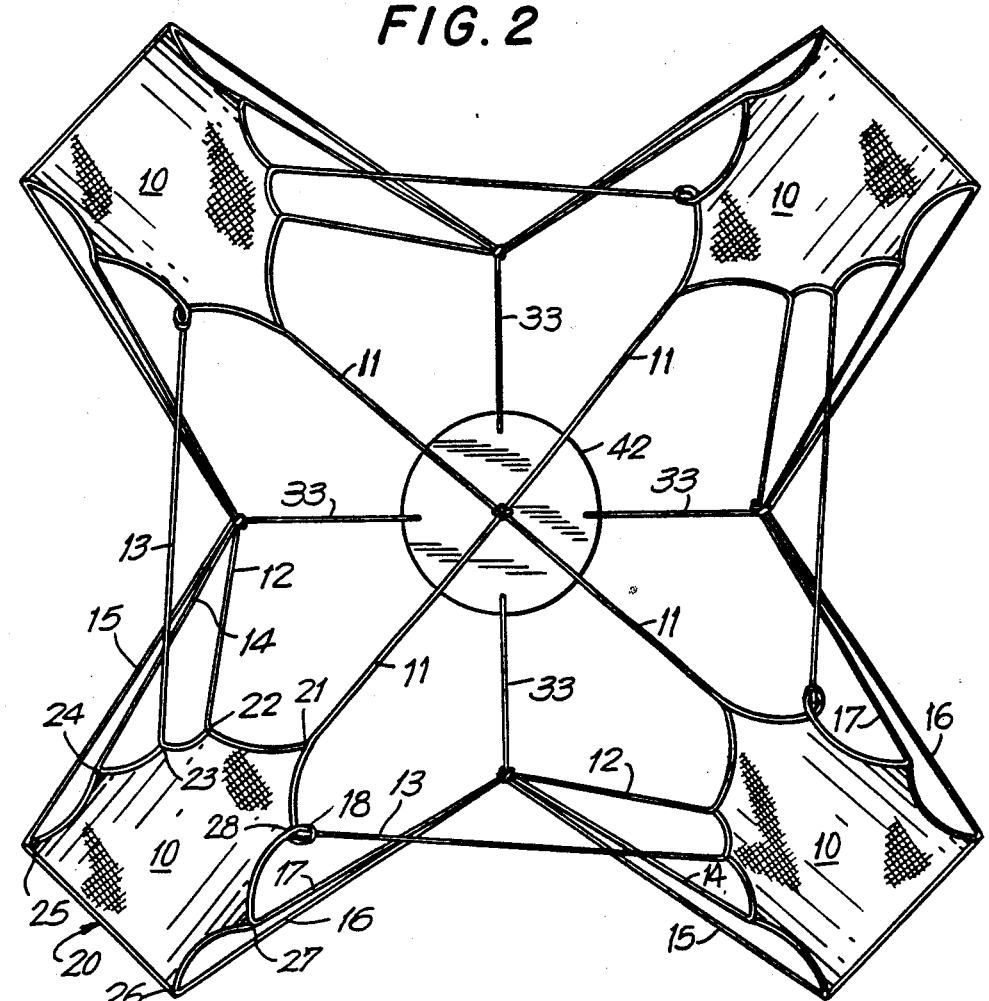
FIG. 2 represents a top plan view of the deployed, or inflated, parachute canopy as formed by the flat panels of FIG. 1, showing the various suspension and pitch and interpanel lines which connect the leading edge cusps to the respective trailing edge cusps of adjacent panels, to effect an angle of incidence for each panel upon deployment.
Figure 3:
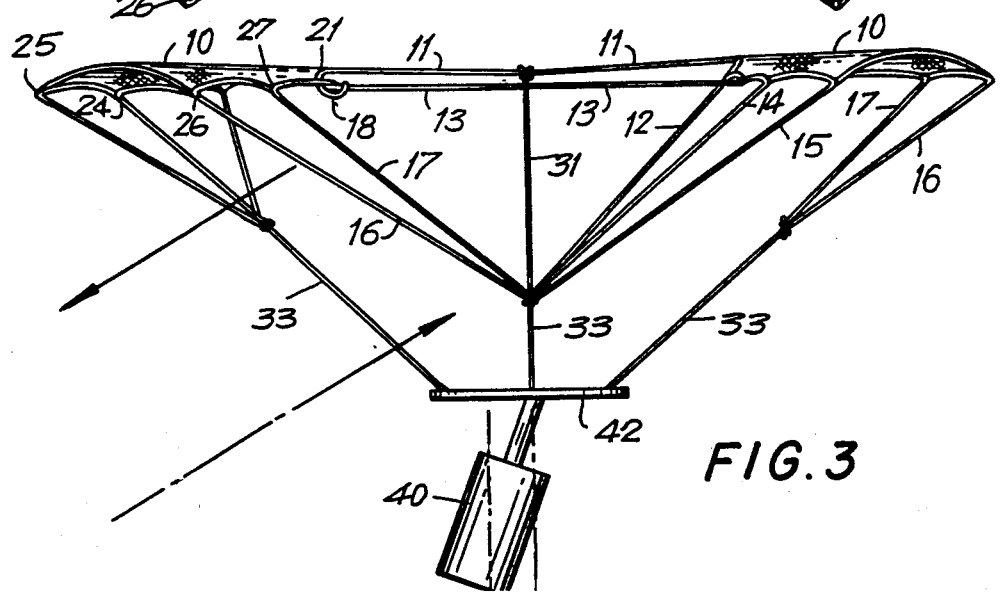
FIG. 3 represents a side elevation of the deployed, or inflated, parachute according to the invention.

When the individual panels 10 are connected via the suspension lines into the canopy configuration shown in FIGS. 2 and 3, each panel is intended to have a leading edge and a trailing edge when operating in the auto rotary mode.

A significant advantage of the present invention, is that it can accomplish the placement of the camber and twist of the panels, when the parachute is deployed, where it can be most efficiently used. This is accomplished in the present invention, by decreasing the total chordwise curvature of each panel by providing relatively small arcuate radii along the leading and trailing edges; additional effectiveness is obtained by providing at least one additional pitch lines cusp on the leading edge of each panel, compared to the trailing edge, and providing for a further connection to a central suspension line to the inboard cusp 21.

Referring to the deployed configuration of FIGS. 2 and 3, four (4) individual fabric panels 10, each having the peripheral tape or cord 40 sewn around its periphery, are combined by interconnecting the inboard apex line 11 from each panel 10, and, if desired, connecting all of the lines 11 to a central suspension line 31. The leading edge interpanel line 13 is connected to a trailing edge cusp 18 in the adjacent panel. The remaining leading edge lines 12, 14 and 15 are connected to the two trailing edge lines 16 and 17 from the adjacent panel and which are in turn all connected to a suspension line 33. The four suspension lines 33 are in turn connected to the peripheral portion of a load-holding swash plate 42.

The swash plate 42 is a rigid platform centered on the central axis of the parachute and capable of supporting a heavy load 40 (which in this example is shown as a suspended load hanging downwardly from the swash plate 42).

In the embodiment shown, those cusps 23, 28, to which are directly connected the interpanel connecting lines 18 and 13 are themselves connected by a cross panel line 38, so as to form a continuous closed inboard loop comprising the interpanel lines 18, 13 and the cross-panel lines 38, of the four (4) panels 10. The panels 10 are substantially uniformly arranged about the central axis, when deployed.

Further, the placement of an additional cusp along the leading edge serves to reduce the radius of curvature of the curves, or cut-outs, connecting the cusps on the leading edge, as compared to the trailing edge. Preferably, the cusps on the leading edge are connected by arcuate curves having a relatively low minimum radius of curvature. The radii of curvature of the central arcuate portions on the trailing edge, i.e., between cusps 27 and 28 and 21, may be somewhat greater than those for the cut-outs on the the leading edge between cusps 22 and 23 and 24. The radius of curvature of the arc between cusps 21 and 22, i.e., the inboard arc on the leading edge, need not be reduced. In fact, by minimizing that curvature, the curvature of the remaining arcs can be increased, i.e., the radius of curvature can be reduced.

The twist and camber of the panels are also affected by the relative lengths of the interpanel and pitch lines. For example, by reducing the length of the inboard pitch line 12 relative to the outboard pitch lines 14, 15, the twist is increased. Similarly, increasing the differential in length between the central pitch lines 14 and 17 and the outboard pitch lines 15 and 16, also increases twist.

The spanwise camber is improved by having the central pitch lines 14, 17 longer than the outboard lines 15, 16; and the chordwise camber is reduced by increasing the number of pitch lines (or cusps) and increasing the curvature of the intermediate arcuate portions.

In an alternate preferred embodiment of this invention, ballast members are distributed along the outboard, or skirt, portion 40 of each panel 10. As shown in FIG. 4, a ballast member or weight 42, formed for example of a piece of metal such as steel or lead, is stitched in place into a pocket at the peripheral skirt portion 40 of the panel 10.

In operation, the ballast weights tend to magnify the centrifugal force effect once the parachute begins to rotate, about its central axis. This causes the panel members to further separate, thereby increasing the overall diameter of the parachute canopy. The ballast member can be sewn into a substantially continuous pocket extending along the skirt portion 40 of each panel, or there can be one or more discrete members, each substantially shorter than the full width of the panel 10.

It has further been found that the effectiveness of the rotating motion can be harnessed to provide a gliding effect for the parachuted load by tilting the central axis of the parachute, and thus, tilting the plane of the individual panels or rotors. The design of the present parachute permits the tilting of the parachute by securing a heavy load to the swash plate 42 so as to offset the center of gravity of the load from the central axis of the parachute.

The leading edge and the trailing edge of each panel 10 are connected to the central swash plate 42 independently of the other via suspension lines 33. As shown in the drawing of FIGS. 2 and 3, the pitch lines from the leading edge of one panel are connected to the pitch lines of the trailing edge of an adjacent second panel, and these pitch control lines are in turn connected to the swash plate 42 via suspension line 33. As shown in the drawings, there is a differential between the number of lines from the leading and trailing edges, and thus the twist can be controlled more fully. The effect of interconnecting the cusps and the lines in the manner shown produces the desirable result.

With the wide spaces between the panels, the solidity or projected area of the canopy is low, with consequent retardation of blossoming after initial deployment. Further it has been found in some cases that after full deployment and with the canopy in autorotation, undesirable luffing of the panel edges occurs. "Luffing" is a loss of lift due to negative incidence at the leading edge of the panel This, of course, adversely affects the drag of the canopy. It is an added feature of the invention that all of these potentially undesirable attributes are resolved by the design of this invention.

The individual panels 10, which are of irregular shape, can best be defined in terms of the location of the cusps and the arcuate portions with reference to a grid superimposed on the panel (see axes "X" and "Y" on FIG. 1). A preferred example of a panel 10 used in the present invention is exemplified by the dimensions in the following table:

| Cusp No. | X (in.) | Y (in.) | Arc depth (d) (in.) | First Slope ($\alpha$) (deg.) | Second Slope ($\beta$) (deg.) |
|---|---|---|---|---|---|
| 21 | −1.90 | 19.0 | .75 | 300 | 240 |
| 22 | +4.50 | 14.85 | .95 | 180 | 210 |
| 23 | +5.60 | 11.20 | .95 | 160 | 220 |
| 24 | +7.50 | 7.40 | 1.25 | 160 | 210 |
| 25 | +7.50 | 0 | 0 | 150 | 180 |
| 26 | −7.50 | 0 | 1.25 | 0 | 30 |
| 27 | −7.50 | 7.40 | 1.10 | 330 | 300 |
| 28 | −5.20 | 13.62 | .40 | 330 | 30 |

In the above table, the cusp nos. refer to FIG. 1; the distance "X" is from the apex of the cusp to the panel centerline; the distance "Y" is from the skirt edge 40; the arc depth (d), is the greatest perpendicular distance between the arc (which in this case is a conic section) and a straight line drawn between the apex of the respective cup and the adjacent cusp apex; angles $\alpha$ and $\beta$, respectively, are the initial slopes of the two arcs forming the apex of the cusp.

The lengths (under tension of 5 lbs.) of the various interpanel and suspension lines of this example are as follows, again referring to the drawings:

| Line No. | Length (in.) |
|---|---|
| 11 | 14.0 |
| 12 | 13.0 |
| 13 | 18.0 |
| 14 | 14.5 |
| 15 | 12.0 |
| 16 | 12.5 |
| 17 | 16.0 |
| 18 | 0.25 |
| 31 | 24.5 |
| 33 | 22.5 |

The panels are formed so as to concentrate tension along the peripheral edges of the panel. Thus, the periphery is constructed so as to provide less give, i.e., a higher modulus of elasticity, than the panel fabric. This can be accomplished by using a tape or string formed of the same or different material, and bound to the fabric of the panel, as by sewing. If the tape is of the same material, the tape will have a substantially larger cross-section than the panel fabric. In the example shown the fabric was 30 denier nylon, and the tape has a MIL-spec of MIL-C-7515-14.

In FIG. 6 a hesitator in the form of a plastic sleeve 50 is formed with a frangible line or section of weakness. Upon deployment of the chute according to the present invention, sleeve 50 holds interpanel lines 13 together so as to produce higher geometric solidity, thereby facilitating a more orderly inflation. It is within the scope of the present invention to hold the ends of lines 13 together, or to directly connect cusps 23 and 28 of adjoining panels by a low tensile strength line, to produce this same rapid inflation. Likewise, the present invention contemplates a sleeve wherein any section along its length will fail, thereby doing away with the need for a specific line of weakness.

What is claimed is:

1. An autorotating parachute having an axis about which the parachute rotates comprising, in combination:
   a canopy formed of a plurality of relatively flexible, flat fabric panels each having portions thereof which are substantially equally and radially spaced from said central axis, each flat panel being defined by arcuate edge portions which intersect at acute-angled cusps;
   suspension lines interconnecting said panels;
   pitch control lines cooperatively connected to said panels,
   a member capable of supporting a payload and being suspended from said panels by a plurality of suspension lines,
   said canopy being characterized by the absence of panel fabric within a predetermined radius about said central axis, thereby forming a central panel-free zone through which the wake of said payload is able to pass without substantially influencing desirable autorotational characteristics of the parachute.

2. An autorotating parachute according to claim 1, wherein said panels are characterized by the absence of seams.

3. An autorotating parachute according to claim 1, wherein said panels are formed with peripheral edge tension members.

4. An autorotating parachute according to claim 1, wherein said cusps include interpanel connecting cusps and panel inboard cusps.

5. An autorotating parachute according to claim 4, wherein said panel inboard cusps are joined at the central axis.

6. An autorotating parachute according to claim 4, comprising an interpanel line joining interpanel connecting cusps of adjacent panels.

7. An autorotating parachute according to claim 5, wherein said interpanel connecting cusps are disposed at opposing leading and trailing peripheral edge portions which, respectively, face adjacent trailing and leading panel edge portions of adjacent panels, said interpanel connecting cusps being interconnected by a line extending across said panel.

8. An autorotating parachute according to claim 7, wherein said line extending across each said panel is joined along its length to the panel fabric and forms part of a closed circumferential loop with said interpanel lines.

9. An autorotating parachute according to claim 1, further comprising suspension lines connected at their respective inner ends to said support member and at their outer ends to the lowermost ends of converging lines which are connected at their uppermost ends to the adjacent panels of leading and trailing edge cusps.

10. An autorotating parachute according to claim 1, wherein each of said panels further comprises a peripheral edge tension member which is secured to the arcuate edge portions and interconnects the leading and trailing arcuate edge portions, aerodynamic chordwise camber being dependent upon said arcuate portions.

11. An autorotating parachute according to claim 7, wherein said leading edge portion includes four acute-angled cusp defined by said arcuate portions and a skirt, and said trailing edge portion includes three acute-angled cusps defined by said arcuate portions and said skirt.

12. An autorotating parachute according to claim 10, wherein said peripheral edge tension members comprise a substantially integral and continuous line which is looped back upon itself at suspension line attachment points so as to form a substantially closed loop periphery for each panel and within which the panel fabric is disposed.

13. An autorotating parachute according to claim 4, further comprising ballast means disposed along an outboard edge of said panels for producing relatively increased centrifugal forces capable of increasing the inflated diameter of the chute.

14. An autorotating parachute according to claim 13, wherein said ballast means includes a pocket formed in said panels for receiving a ballast member.

15. An autorotating parachute according to claim 13, further comprising means for tilting the plane of tips of said panels to cause gliding of the payload.

16. An autorotating parachute according to claim 15, wherein all suspension lines functionally communicate with a substantially central swash plate, such that tilting of the swash plate will result in tilting of the plane of rotation of said panel tips.

17. An autorotating parachute according to claim 11, wherein leading edge panel cusps are influenced by pitch lines communicating with a substantially central swash plate relatively independent of pitch lines which influence trailing edge panel cusps, thereby enabling varying of panel pitch cyclically.

18. An autorotating parachute according to claim 15, wherein the payload is able to spin with the parachute and a periodic moment is applied to the swash plate synchronously to cause gliding.

19. An autorotating parachute according to claim 1, further including means for holding the interpanel lines held together during chute deployment to produce relatively higher geometric solidity so as to cause a more rapid inflation.

20. An autorotating parachute according to claim 19, further comprising means for releasing said holding means after inflation has begun.

21. An autorotating rotating parachute according to claim 20, wherein said releasing means comprises a connector formed with a portion having a predetermined failure threshold influenced by inflation loads.

22. An autorotating parachute according to claim 20, wherein the holding means comprises an open-ended tube.

23. An autorotating parachute according to claim 5, comprising at least one suspension line extending from the interconnected inboard cusps at the central axis to the payload support member.

* * * * *